(12) United States Patent
Liu et al.

(10) Patent No.: US 8,447,102 B2
(45) Date of Patent: May 21, 2013

(54) VECTOR EMBEDDED GRAPHICS CODING

(75) Inventors: Wei Liu, San Jose, CA (US);
Mohammad Gharavi-Alkhansari,
Santa Clara, CA (US)

(73) Assignee: Sony Corporation, Tokyo (JP)

( * ) Notice: Subject to any disclaimer, the term of this patent is extended or adjusted under 35 U.S.C. 154(b) by 387 days.

(21) Appl. No.: 12/873,033

(22) Filed: Aug. 31, 2010

(65) Prior Publication Data

US 2011/0050959 A1 Mar. 3, 2011

Related U.S. Application Data

(60) Provisional application No. 61/239,231, filed on Sep. 2, 2009.

(51) Int. Cl.
*G06K 9/00* (2006.01)
*G06K 9/36* (2006.01)
*H04N 5/76* (2006.01)

(52) U.S. Cl.
USPC ....... 382/166; 382/162; 382/232; 348/231.99

(58) Field of Classification Search
None
See application file for complete search history.

(56) References Cited

U.S. PATENT DOCUMENTS

| | | | |
|---|---|---|---|
| 4,319,267 A | 3/1982 | Mitsuya et al. | |
| 5,659,631 A | 8/1997 | Gormish et al. | |
| 5,805,226 A | 9/1998 | Jung | |
| 6,778,709 B1 | 8/2004 | Taubman | |
| 8,306,322 B2 * | 11/2012 | Liu et al. | 382/166 |
| 2003/0002742 A1 * | 1/2003 | Sano et al. | 382/239 |
| 2004/0213472 A1 * | 10/2004 | Kodama et al. | 382/239 |
| 2007/0189397 A1 | 8/2007 | Ngo et al. | |
| 2007/0202842 A1 | 8/2007 | Shao et al. | |
| 2008/0298694 A1 | 12/2008 | Kim et al. | |
| 2009/0265744 A1 | 10/2009 | Singh et al. | |
| 2010/0310169 A1 * | 12/2010 | Liu et al. | 382/171 |
| 2010/0322597 A1 * | 12/2010 | Gharavi-Alkhansari et al. | 386/328 |
| 2011/0033126 A1 * | 2/2011 | Liu et al. | 382/238 |
| 2011/0085058 A1 * | 4/2011 | Liu et al. | 348/231.99 |
| 2011/0128403 A1 * | 6/2011 | Easwar et al. | 348/222.1 |
| 2011/0228973 A1 * | 9/2011 | Agaian et al. | 382/100 |

FOREIGN PATENT DOCUMENTS

| | | |
|---|---|---|
| KR | 10-2002-0026242 A | 4/2002 |
| KR | 10-2003-0063850 A | 7/2003 |

OTHER PUBLICATIONS

Wu, Guo-Zua et al., High-Performance Sub-Picture Compression Algorithm Used in High-Definition Video Discs, IEEE Transations on Magnetics, vol. 43, No. 2, Feb. 2007, pp. 776-779.

(Continued)

*Primary Examiner* — Lin Ye
*Assistant Examiner* — John H Morehead, III
(74) *Attorney, Agent, or Firm* — Haverstock & Owens LLP (57) ABSTRACT

A method of coding High Definition (HD) color pictures is described. The method divides the HD picture into individual bit planes of the three colors. The method then interleaves the bit planes such that bit planes of the three colors having the same significance are coded together. The method codes a block of the picture based on the bit distribution in corresponding groups of the corresponding bit planes of the three colors. The method performs a first level grouping of bits in a bit plane of an image and a second level grouping of the first level grouping bits of different color components within a group.

30 Claims, 3 Drawing Sheets

OTHER PUBLICATIONS

Noam Geri, "Wireless HDTV solves problems that compression cannot", EE Times—India,www.eetindia.com, pp. 1-3.

Singh, Harkirat et al., "A 60GHz Wireless Network for Enabling Uncompressed Video Communication", Department of Electrical and Computer Engineering Articles,IEE Communications Magazine, Dec. 2008,pp. 71-78, http://opensiuc.lib.siu.edu/ecc_articles/8.

A.J. Pinho, "Region-Based Near-Lossless Image Compression", Acoustics, Speech, and Signal Processing, May 2011,IEEE International Conference, vol. 3, pp. 1761-1764.

* cited by examiner

Current Group

VECTOR EMBEDDED GRAPHICS CODING

CROSS-REFERENCE TO RELATED APPLICATION(S)

This application claims priority under 35 U.S.C. 119(e) of the U.S. Provisional Patent Application Ser. No. 61/239,231, filed Sep. 2, 2009 and entitled, "Vector Embedded Graphics Coding," which is hereby incorporated by reference in its entirety for all purposes.

FIELD OF THE INVENTION

The present invention relates to the field of image processing. More specifically, the present invention relates to embedded graphics coding.

BACKGROUND OF THE INVENTION

Most image compression schemes are designed for "natural images" such as photos taken by a digital camera. For natural images, strong correlation exists among neighboring pixels. Hence, most image compression schemes work as follows:

1. The pixels are decorrelated using prediction or transform or both, resulting in a sparse histogram of the prediction residuals or transform coefficients. The histogram has a single peak which is located around 0.
2. Quantization is applied as necessary.
3. The (quantized) prediction residuals or transform coefficients are entropy coded. The entropy coder is designed for distributions described above. If the distribution has a significantly different shape, the coding performance is able to be poor.

However, there are many "unnatural images" such as images of graphics or text which typically have a large dynamic range, strong contrast, sharp edges, strong textures and sparse histograms. These types of images are usually not handled well by conventional image compression algorithms. Inter-pixel correlation is weaker, and prediction or transform does not provide a sparse distribution as it does for natural images.

Some schemes have been proposed for unnatural images. One example is referred to as "histogram packing" where the encoder goes through the whole image, computes the histogram and does a non-linear mapping of the pixels before compressing the image. The compression requires a two-pass processing, causing increased memory cost and more computations. The bitstream is not scalable which means that the decoder needs the whole bitstream to decode the image. Partial reconstruction is not possible without re-encoding.

SUMMARY OF THE INVENTION

A method of coding High Definition (HD) color pictures of sparse histograms is described. The method divides the HD picture into individual bit planes of the three colors. The method then interleaves the bit planes such that bit planes of the three colors having the same significance are coded together. The method codes a block of the picture based on the bit distribution in corresponding groups of the corresponding bit planes of the three colors. Each group includes all three color components in a bit plane. In vector embedded graphics coding: 1) No prediction or transform is performed; 2) coding is done from the Most Significant Bitplane (MSB) to the Least Significant Bitplane (LSB) of the pixels; 3) the three color components are coded together (as a vector); 4) if at a certain bit-plane, all pixels in a group have the same refinement bits within each of the color components, a 0 is sent indicating the group is not split, followed by 3 bits for the refinement bits (1 bit for each color); 5) otherwise, a 1 is sent indicating the current group is split, then the method looks into each color to see which color(s) requires a split; 6) once a split happens in one color, the split is also applied in the other two colors.

In one aspect, a method of encoding programmed in a controller in a device comprises performing a first level grouping of bits in a color component of a bit plane of an image and performing a second level grouping of the first level grouping bits. The method further comprises interleaving bit planes of the image to generate a virtual block. Performing the first level grouping further comprises determining if a color component in the group includes a split, if the color component includes the split, indicating the split for the color component with a first-level indicator bit and coding bits of the color component in a raster scan order, if the color component does not include the split, indicating no split for the color component with the first-level indicator bit and coding a refinement bit and repeating the steps a-c for each of the color components in the group. Performing the second level grouping further comprises determining if any of the first-level indicator bits indicate the split, if the first-level indicator bits do not indicate the split, then coding a second-level indicator bit indicating no split and omitting all of the first-level indicator bits and if the first-level indicator bits indicate the split, then coding the second-level indicator bit indicating the split. Performing the second level grouping further comprises determining if any of the indicator bits of the three colors components are all zeros, if the indicator bits are all zeros, then coding a second level bit of zero indicating all zeros and omitting the first level indicator bits and otherwise, the second level bit is coded as a one, indicating at least one split happens in the three color components. Once the split is found, the split is applied to other color components. The split comprises disparate bit values and the no split comprises same bit values. The color components are selected from the group consisting of RGB and YUV. When the split happens in the color component, the refinement bits of group members of the color component within an original group are sent in a raster scan order which are able to be sent using raw bits or employing one of a run length coding and a prediction coding. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In another aspect, a method of encoding programmed in a controller in a device comprises acquiring an image, dividing the image into bit planes, interleaving the bit planes to generate a virtual block, wherein color components of a bit plane having a same significance coded together, implementing two-level signal grouping where there are no splits within the color components and implementing two-level signal grouping where there is at least one split within the color components. The two-level signal grouping where there are no splits further comprises indicating no split and coding a refinement bit for each of the color components. The two-level signal grouping where there is at least one split further comprises indicating the split and coding each individual color component using a first level grouping. The first level grouping comprises sending an indicator bit for a group of pixels in a color component, indicating if all the bit values of the group members are the same, if the bit values are the same, one bit is used to specify the bit value and otherwise, refinement bits are sent for all group members. When a split happens in one color component, the split is also applied to the other two color components. The method further comprises displaying an encoded image of the coded bits. The split comprises disparate bit values and the no split comprises same bit values. The color components are selected from the group consisting of RGB and YUV. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

In yet another aspect, a system for encoding programmed in a controller in a device comprises an acquisition module for acquiring an image, a dividing module for dividing an image into bit planes, an interleave module for interleaving the bit planes and a two level signal grouping module for implementing two-level signal grouping. The two-level signal grouping further comprises indicating no split and coding a refinement bit for each of the color components where there are no splits. The two-level signal grouping further comprises indicating the split and coding each individual color component using a first level grouping. The first level grouping comprises sending an indicator bit for a group of pixels in a color component, indicating if all the bit values of the group members are the same, if the bit values are the same, one bit is used to specify the bit value and otherwise, refinement bits are sent for all group members. When a split happens in one color component, the split is also applied to the other two color components. The system further comprises displaying an encoded image of the coded bits. The split comprises disparate bit values and the no split comprises same bit values. The color components are selected from the group consisting of RGB and YUV.

In yet another aspect, a camera device comprises a video acquisition component for acquiring a video, a memory for storing an application, the application for interleaving bit planes of an image to generate a virtual block, wherein color components of a bit plane having a same significance are grouped into a group, implementing two-level signal grouping where there are no splits within the color components and implementing two-level signal grouping where there is at least one split within the color components and a processing component coupled to the memory, the processing component configured for processing the application. The two-level signal grouping where there is the at least one split further comprises indicating the split and coding each individual color component using a first level grouping. The first level grouping comprises sending an indicator bit for a group of pixels in a color component, indicating if all the bit values of the group members are the same, if the bit values are the same, one bit is used to specify the bit value and otherwise, refinement bits are sent for all group members. When the split happens in one color component, the split is also applied to the other two color components. The camera device further comprises displaying an encoded image of the coded bits. The split comprises disparate bit values and the no split comprises same bit values. The color components are selected from the group consisting of RGB and YUV.

DETAILED DESCRIPTION OF THE PREFERRED EMBODIMENT

A method of coding High Definition (HD) color pictures of sparse histograms is described. In some embodiments, the encoding pictures are transmitted over a Wireless HD (WiHD) link. The method divides the HD picture into individual bit planes, where each bit plane includes color components such as RGB. The method then interleaves the bit planes such that bit planes of the colors having the same significance are coded together, for example, the Most Significant Bit planes (MSBs) of the RGB colors are coded together followed by the second MSBs and so forth through the Least Significant Bit planes (LSBs).

The method codes a block of the picture based on the bit distribution in groups of the corresponding bit planes of the three colors. If the bits in a color component in a group are all the same (e.g. all 0s or all 1s), then the color component does not include a split. For example, if the Red component of the group includes all 1s, then the group does not include a split which is indicated by a "0" in an indicator bit. If the Red component of the group includes 0s and 1s, then the Red component does include a split which is indicated by a "1" in the indicator bit. Following a "0" indicator bit, a refinement bit is included to indicate which bit is contained in the non-split color component. Following a "1" indicator bit, the raw bits in the color component are included, the group is split into two and the splitting is also applied to the other two colors.

In a second level grouping, the indicator bits of each of the color components are compared to determine if there is a split or not among the indicator bits. For example, if the Red component of the group includes all 1s, the Green component of the group includes all 0s and the Blue component of the group includes all 1s, then each of the indicator bits are 0s, and the group does not include a split which is able to be indicated using a second-level indicator bit (e.g. "0"). For a group without a split, the method codes the bit plane of the block as a "0," indicating no split in bit distribution, followed by three refinement bits, one for each color, indicating whether the bits in the group of that color are is or 0s. For a group with a split, the method codes the second-level indicator bit for the group as a "1," indicating a split in one of the color components of the group, followed by the individual color components coding. For example, if a color component has a split, then the method codes the color component as a "1," indicating a split in the bit distribution, followed by the raw bits. If a color component does not include a split, then the method codes the color component as a "0," indicating no split in the bit distribution and then a refinement bit is included for that color component. In some embodiments, the raw bits of a split color component are sent in the raster scan order. In some embodiments, run length coding and/or prediction coding are able to be applied for transmitting the raw bits of the color component of the group. Additionally, a split in one color component continues for other color components. For example, if a G color component is split, then the split is continued for the B color component as well.

Vector Embedded Graphics Coding (Vector EGC) improves the coding performance for color pictures of EGC described in U.S. patent application Ser. No. 12/795,210, filed Jun. 7, 2010 and entitled, "Embedded Graphics Coding for Images with Sparse Histograms," which is hereby incorporated by reference in its entirety for all purposes, and EGC in U.S. patent application Ser. No. 12/795,210, filed Jun. 7, 2010 and entitled, "A Method For Improving The Performance Of Embedded Graphics," is hereby incorporated by reference in its entirety for all purposes.

In "Embedded Graphics Coding for Images with Sparse Histograms," if a group is to be split, raw bits are sent for each member in the group in the current bit-plane resulting in more than 1 bit per sample (bps) for any color component in a block that has at least one split.

In "A Method for Improving the Performance of Embedded Graphics," prediction plus run length coding (RLC) is used to replace raw-bit coding. For example, for a bi-color block, if there is a split needed for each color component, and the groups after splitting are the same for all color components, then there is redundancy. Splitting three times is not efficient in terms of rate.

Vector EGC is performed in the 3D vector space of RGB or YUV. If one of the color components demands a split, the same split is also applied in the other two colors.

Figure 1:
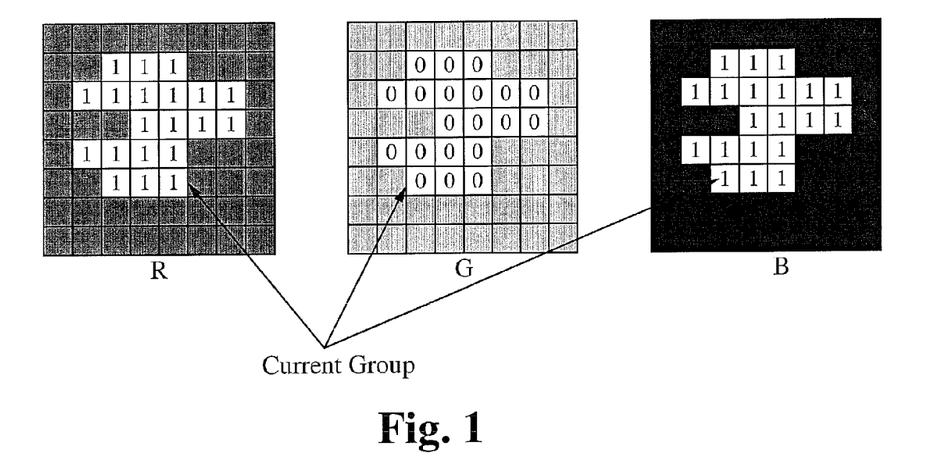
FIG. 1 illustrates an example of implementing two-level signal grouping where there are no splits according to some embodiments.

FIG. 1 illustrates an example of implementing two-level signal grouping where there are no splits according to some embodiments. A second-level grouping bit of "0" is sent to indicate that there is no splitting in any color component since in the first color of the group, all of the pixels are 1s, in the second color of the group, all of the pixels are 0s and in the third color of the group, all of the pixels are 1s. Then, three refinement bits are sent (one bit for each color): 1 0 1 where the bit indicates the bits stored in that group. For example, if a group contains all 0s in a color component, a 0 refinement bit is sent for that color component, and if a group contains all 1s in a color component, a 1 refinement bit is sent for that color component.

Figure 2:
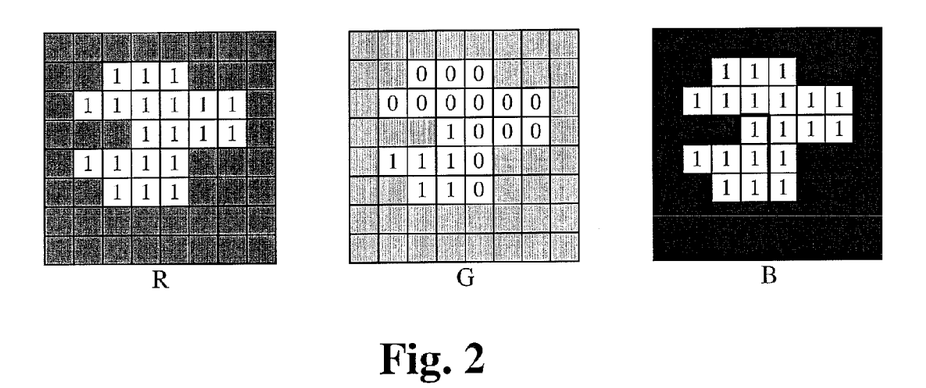
FIG. 2 illustrates an example of implementing two-level signal grouping where there is a split according to some embodiments.

FIG. 2 illustrates an example of implementing two-level signal grouping where there is a split according to some embodiments. A second-level grouping bit of "1" is sent to indicate the current group is split in at least one color component. For encoding Red (R), a first-level grouping bit of "0" is sent to indicate that R is not split and then a "1" is sent to refine R, since R contains all 1s. For encoding Green (G), a first-level grouping bit of "1" is sent to indicate that G is split since it contains both 0s and 1s. Then, the raw bits are sent in a raster-scan order to refine G: "0 0 0 . . . 1 1 0." Alternatively, prediction plus RLC is able to be applied in this stage. The split remains effective for the upcoming Blue (B) color component. For encoding B, each of the two groups that were generated during the encoding of G are processed. The first group is processed, sending a first-level grouping bit of "0" to indicate the first sub-group of B is not split and then sending a "1" for refinement, since the first sub-group contains all 1s. The second sub-group of B is processed, sending a first-level grouping bit of "0" to indicate that the second sub-group is not split and then sending a "1" for refinement, since the group contains all 1s. The split is also effective for the coding of the next bit plane of the R component.

Figure 3:
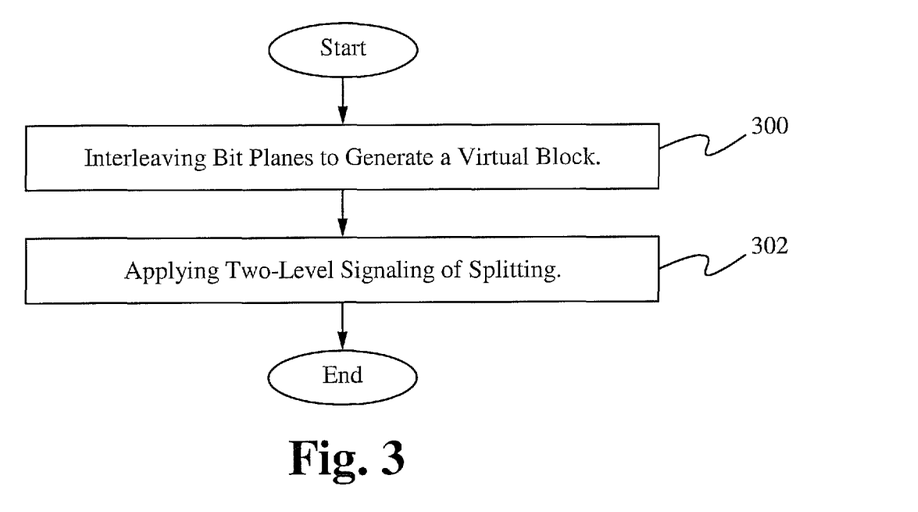
FIG. 3 illustrates a flowchart of a method of implementing vector EGC according to some embodiments.

FIG. 3 illustrates a flowchart of a method of implementing vector EGC according to some embodiments. In the step 300, bit planes are interleaved to generate a virtual block with 24 bit planes. The number of bit planes is able to be different depending on the implementation. In the step 302, two-level signaling of splitting is applied. Two-level signaling of grouping includes a first-level grouping by first determining if any of the color components in a group are split. If a color component is not split, then a "0" is coded to indicate no split. If a color component is split, then a "1" is coded to indicate the split. Then, a second level of grouping determination is performed by determining if the first-level indication bits of the color components are the same. For example, if each of the RGB color components are not split, then their indication bits will each be a "0" and are able to be further grouped as a "0" in the second level determination. As described above, the refinement bits of each color component are coded following the second level determination bit. If the indication bits are not all the same, for example, R contains a "0" indication bit, G contains a "1" indication bit and B contains a "0" indication bit, then a "1" is indicated for the second level determination. As described above, the refinement bits or raw bits are coded following the indication bit of each bit plane depending on whether the color component is split. Fewer or additional steps are able to be included. Further, the order of the steps is able to be changed where possible.

Figure 4:
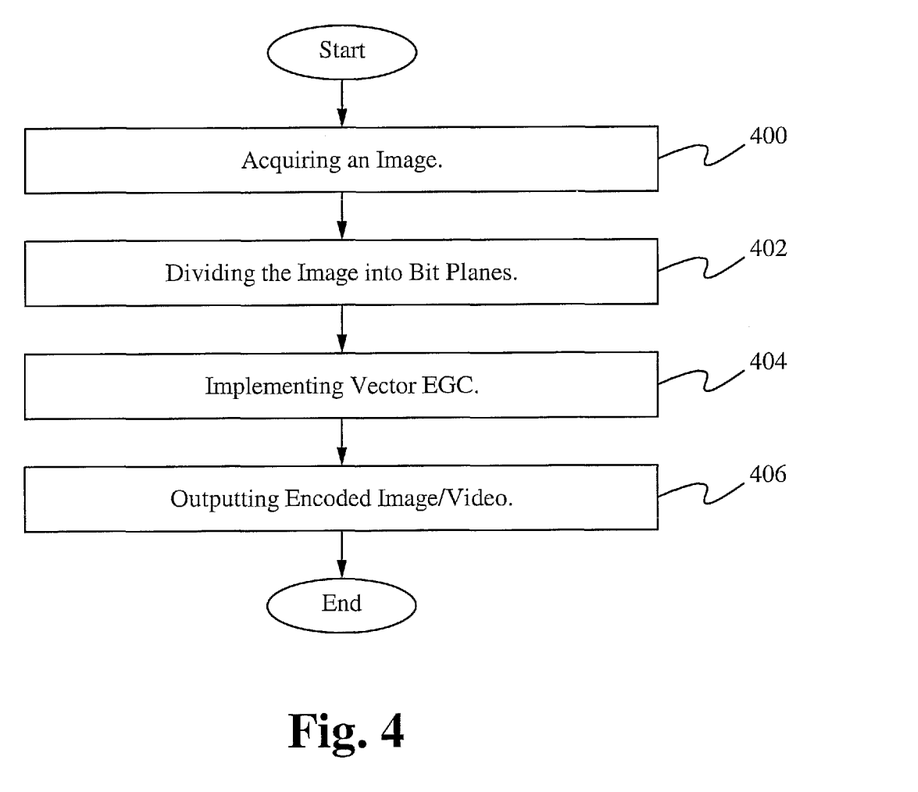
FIG. 4 illustrates a flowchart of a method of encoding an image according to some embodiments.

FIG. 4 illustrates a flowchart of a method of encoding an image according to some embodiments. In the step 400, an image is acquired. For example, a camcorder records a video, and each frame is an image. In the step 402, the image is divided into bit planes (e.g. 24 bit planes). In the step 404, Vector EGC is implemented as described herein. In the step 406, the encoded video is output (e.g. displayed on a computer). Fewer or additional steps are able to be included. Further, the order of the steps is able to be changed where possible.

Figure 5:
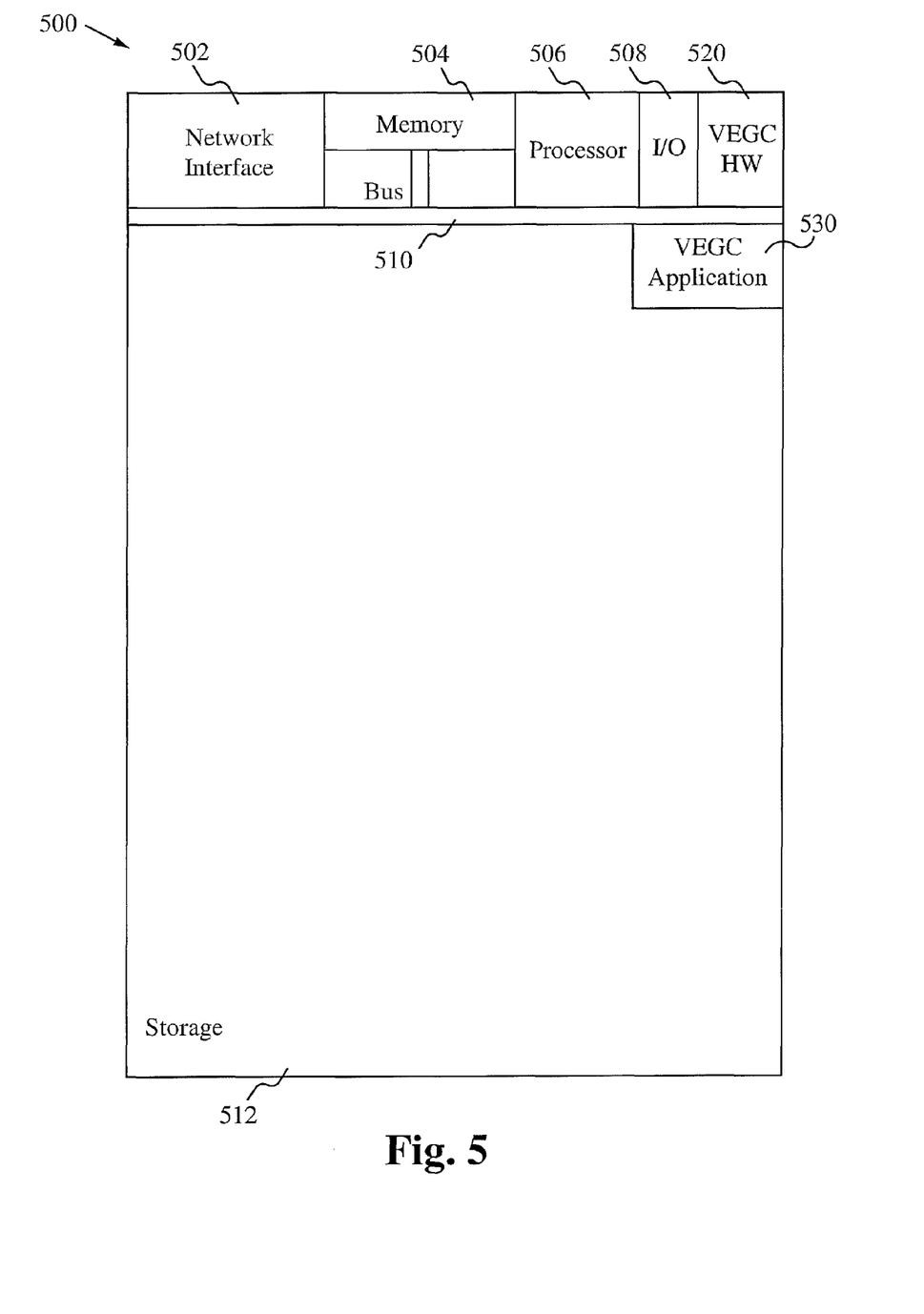
FIG. 5 illustrates a block diagram of an exemplary computing device configured to implement the Vector EGC method according to some embodiments.

FIG. 5 illustrates a block diagram of an exemplary computing device 500 configured to implement the vector EGC method according to some embodiments. The computing device 500 is able to be used to acquire, store, compute, communicate and/or display information such as images and videos. For example, a computing device 500 is able to acquire and store a video. The VEGC method is able to be used during or after acquiring the video, or when transferring the video from the device 500 to another device. In general, a hardware structure suitable for implementing the computing device 500 includes a network interface 502, a memory 504, a processor 506, I/O device(s) 508, a bus 510 and a storage device 512. The choice of processor is not critical as long as a suitable processor with sufficient speed is chosen. The memory 504 is able to be any conventional computer memory known in the art. The storage device 512 is able to include a hard drive, CDROM, CDRW, DVD, DVDRW, flash memory card or any other storage device. The computing device 500 is able to include one or more network interfaces 502. An example of a network interface includes a network card connected to an Ethernet or other type of LAN. The I/O device(s) 508 are able to include one or more of the following: keyboard, mouse, monitor, display, printer, modem, touchscreen, button interface and other devices. VEGC application(s) 530 used to perform the VEGC method are likely to be stored in the storage device 512 and memory 504 and processed as applications are typically processed. More or less components shown in FIG. 5 are able to be included in the computing device 500. In some embodiments, VEGC hardware 520 is included. Although the computing device 500 in FIG. 5 includes applications 530 and hardware 520 for improved embedded graphics coding, the VEGC method is able to be implemented on a computing device in hardware, firmware, software or any combination thereof. For example, in some embodiments, the VEGC applications 530 are programmed in a memory and executed using a processor. In another example, in some embodiments, the VEGC hardware 520 is programmed hardware logic including gates specifically designed to implement the compression method.

In some embodiments, the VEGC application(s) 530 include several applications and/or modules. As described herein, modules such as an acquisition module for acquiring an image, a dividing module for dividing an image into bit planes, an interleave module for interleaving the bit planes, a two-level signal grouping module for implementing the two-level signal grouping described are able to be included. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a television, a home entertainment system or any other suitable computing device.

To utilize the vector embedded graphics coding method, a user acquires a video/image such as on a digital camcorder, and while or after the video is acquired, or when sending the video to another device such as a computer, the vector embedded graphics coding method automatically encodes each image of the video, so that the video is encoded appropriately to maintain a high quality video. The vector embedded graphics coding method occurs automatically without user involvement.

In operation, vector embedded graphics coding is used when a group is to be split. Each image block is processed from the MSB to the LSB, hence the resulting bitstream is still embedded. The vector embedded graphics coding utilizes second-level coding/grouping to minimize the number of coded bits. The vector embedded graphics coding also propagates a split, so that additional colors utilize the split when encoding. The vector embedded graphics coding method is able to be used in any implementation including, but not limited to, wireless high definition (Wireless HD).

The vector embedded graphics coding method described herein is able to be used with videos and/or images.

High definition video is able to be in any format including but not limited to HDCAM, HDCAM-SR, DVCPRO HD, D5 HD, XDCAM HD, HDV and AVCHD.

Some Embodiments of Vector Embedded Graphics Coding

1. A method of encoding programmed in a controller in a device comprising:
    a. performing a first level grouping of bits in a color component of a bit plane of an image; and
    b. performing a second level grouping of the first level grouping bits.
2. The method of clause 1 further comprising interleaving bit planes of the image to generate a virtual block.
3. The method of clause 1 wherein performing the first level grouping further comprises:
    a. determining if a color component in the group includes a split;
    b. if the color component includes the split, indicating the split for the color component with a first-level indicator bit and coding bits of the color component in a raster scan order;
    c. if the color component does not include the split, indicating no split for the color component with the first-level indicator bit and coding a refinement bit; and
    d. repeating the steps a-c for each of the color components in the group.
4. The method of clause 3 wherein performing the second level grouping further comprises:
    a. determining if any of the first-level indicator bits indicate the split;
    b. if the first-level indicator bits do not indicate the split, then coding a second-level indicator bit indicating no split and omitting all of the first-level indicator bits; and
    c. if the first-level indicator bits indicate the split, then coding the second-level indicator bit indicating the split.
5. The method of clause 3 wherein performing the second level grouping further comprises:
    a. determining if any of the indicator bits of the three colors components are all zeros;
    b. if the indicator bits are all zeros, then coding a second level bit of zero indicating all zeros and omitting the first level indicator bits; and
    c. otherwise, the second level bit is coded as a one, indicating at least one split happens in the three color components.
6. The method of clause 4 wherein once the split is found, the split is applied to other color components.
7. The method of clause 3 wherein the split comprises disparate bit values and the no split comprises same bit values.
8. The method of clause 3 wherein the color components are selected from the group consisting of RGB and YUV.
9. The method of clause 3 wherein when the split happens in the color component, the refinement bits of group members of the color component within an original group are sent in a raster scan order which are able to be sent using raw bits or employing one of a run length coding and a prediction coding.
10. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.
11. A method of encoding programmed in a controller in a device comprising:
    a. acquiring an image;
    b. dividing the image into bit planes;
    c. interleaving the bit planes to generate a virtual block, wherein color components of a bit plane having a same significance coded together;
    d. implementing two-level signal grouping where there are no splits within the color components; and
    e. implementing two-level signal grouping where there is at least one split within the color components.
12. The method of clause 11 wherein the two-level signal grouping where there are no splits further comprises indicating no split and coding a refinement bit for each of the color components.
13. The method of clause 12 wherein the two-level signal grouping where there is the at least one split further comprises indicating the split and coding each individual color component using a first level grouping.

14. The method of clause 13 wherein the first level grouping comprises:
   a. sending an indicator bit for a group of pixels in a color component, indicating if all the bit values of the group members are the same;
   b. if the bit values are the same, one bit is used to specify the bit value; and
   c. otherwise, refinement bits are sent for all group members.
15. The method of clause 14 wherein when a split happens in one color component, the split is also applied to the other two color components.
16. The method of clause 13 further comprising displaying an encoded image of the coded bits.
17. The method of clause 11 wherein the split comprises disparate bit values and the no split comprises same bit values.
18. The method of clause 11 wherein the color components are selected from the group consisting of RGB and YUV.
19. The method of clause 11 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.
20. A system for encoding programmed in a controller in a device comprising:
   a. an acquisition module for acquiring an image;
   b. a dividing module for dividing an image into bit planes;
   c. an interleave module for interleaving the bit planes; and
   d. a two level signal grouping module for implementing two-level signal grouping.
21. The system of clause 20 wherein the two-level signal grouping further comprises indicating no split and coding a refinement bit for each of the color components where there are no splits.
22. The system of clause 21 wherein the two-level signal grouping further comprises indicating the split and coding each individual color component using a first level grouping.
23. The system of clause 22 wherein the first level grouping comprises:
   a. sending an indicator bit for a group of pixels in a color component, indicating if all the bit values of the group members are the same;
   b. if the bit values are the same, one bit is used to specify the bit value; and
   c. otherwise, refinement bits are sent for all group members.
24. The system of clause 23 wherein when a split happens in one color component, the split is also applied to the other two color components.
25. The system of clause 22 further comprising displaying an encoded image of the coded bits.
26. The system of clause 22 wherein the split comprises disparate bit values and the no split comprises same bit values.
27. The system of clause 20 wherein the color components are selected from the group consisting of RGB and YUV.
28. A camera device comprising:
   a. a video acquisition component for acquiring a video;
   b. a memory for storing an application, the application for:
      i. interleaving bit planes of an image to generate a virtual block, wherein color components of a bit plane having a same significance are grouped into a group;
      ii. implementing two-level signal grouping where there are no splits within the color components; and
      iii. implementing two-level signal grouping where there is at least one split within the color components; and
   c. a processing component coupled to the memory, the processing component configured for processing the application.
29. The camera device of clause 28 wherein the two-level signal grouping where there is the at least one split further comprises indicating the split and coding each individual color component using a first level grouping.
30. The camera device of clause 29 wherein the first level grouping comprises:
   a. sending an indicator bit for a group of pixels in a color component, indicating if all the bit values of the group members are the same;
   b. if the bit values are the same, one bit is used to specify the bit value; and
   c. otherwise, refinement bits are sent for all group members.
31. The camera device of clause 30 wherein when the split happens in one color component, the split is also applied to the other two color components.
32. The camera device of clause 29 further comprising displaying an encoded image of the coded bits.
33. The camera device of clause 29 wherein the split comprises disparate bit values and the no split comprises same bit values.
34. The camera device of clause 28 wherein the color components are selected from the group consisting of RGB and YUV.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of encoding programmed in a controller in a device comprising:
   a. performing a first level grouping of bits in a color component of a bit plane of an image, wherein performing the first level grouping further comprises:
      i. determining if a color component in the group includes a split;
      ii. if the color component includes the split, indicating the split for the color component with a first-level indicator bit and coding bits of the color component in a raster scan order;
      iii. if the color component does not include the split, indicating no split for the color component with the first-level indicator bit and coding a refinement bit; and
      iv. repeating the steps i-iii for each of the color components in the group; and
   b. performing a second level grouping of the first level grouping bits.
2. The method of claim 1 further comprising interleaving bit planes of the image to generate a virtual block.
3. The method of claim 1 wherein performing the second level grouping further comprises:
   a. determining if any of the first-level indicator bits indicate the split;

b. if the first-level indicator bits do not indicate the split, then coding a second-level indicator bit indicating no split and omitting all of the first-level indicator bits; and c. if the first-level indicator bits indicate the split, then coding the second-level indicator bit indicating the split.

4. The method of claim 1 wherein performing the second level grouping further comprises:

a. determining if any of the indicator bits of the three colors components are all zeros;

b. if the indicator bits are all zeros, then coding a second level bit of zero indicating all zeros and omitting the first level indicator bits; and    c. otherwise, the second level bit is coded as a one, indicating at least one split happens in the three color components.

5. The method of claim 3 wherein once the split is found, the split is applied to other color components.

6. The method of claim 1 wherein the split comprises disparate bit values and the no split comprises same bit values.

7. The method of claim 1 wherein the color components are selected from the group consisting of RGB and YUV.

8. The method of claim 1 wherein when the split happens in the color component, the refinement bits of group members of the color component within an original group are sent in a raster scan order which are able to be sent using raw bits or employing one of a run length coding and a prediction coding.

9. The method of claim 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

10. A method of encoding programmed in a controller in a device comprising:

a. acquiring an image;

b. dividing the image into bit planes;

c. interleaving the bit planes to generate a virtual block, wherein color components of a bit plane having a same significance coded together;

d. implementing two-level signal grouping where there are no splits within the color components by indicating no split and coding a refinement bit for each of the color components; and    e. implementing two-level signal grouping where there is at least one split within the color components by indicating the split and coding each individual color component using a first level grouping.

11. The method of claim 10 wherein the first level grouping comprises:

a. sending an indicator bit for a group of pixels in a color component, indicating if all the bit values of the group members are the same;

b. if the bit values are the same, one bit is used to specify the bit value; and    c. otherwise, refinement bits are sent for all group members.

12. The method of claim 11 wherein when a split happens in one color component, the split is also applied to the other two color components.

13. The method of claim 10 further comprising displaying an encoded image of the coded bits.

14. The method of claim 10 wherein the split comprises disparate bit values and the no split comprises same bit values.

15. The method of claim 10 wherein the color components are selected from the group consisting of RGB and YUV.

16. The method of claim 10 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a television and a home entertainment system.

17. A system for encoding programmed in a controller in a device comprising:

a. an acquisition module for acquiring an image;

b. a dividing module for dividing an image into bit planes;

c. an interleave module for interleaving the bit planes; and d. a two level signal grouping module for implementing two-level signal grouping.

18. The system of claim 17 wherein the two-level signal grouping further comprises indicating no split and coding a refinement bit for each of the color components where there are no splits.

19. The system of claim 18 wherein the two-level signal grouping further comprises indicating the split and coding each individual color component using a first level grouping.

20. The system of claim 19 wherein the first level grouping comprises:

a. sending an indicator bit for a group of pixels in a color component, indicating if all the bit values of the group members are the same;

b. if the bit values are the same, one bit is used to specify the bit value; and    c. otherwise, refinement bits are sent for all group members.

21. The system of claim 20 wherein when a split happens in one color component, the split is also applied to the other two color components.

22. The system of claim 19 further comprising displaying an encoded image of the coded bits.

23. The system of claim 19 wherein the split comprises disparate bit values and the no split comprises same bit values.

24. The system of claim 17 wherein the color components are selected from the group consisting of RGB and YUV.

25. A camera device comprising:

a. a video acquisition component for acquiring a video;

b. a memory for storing an application, the application for:

i. interleaving bit planes of an image to generate a virtual block, wherein color components of a bit plane having a same significance are grouped into a group;

ii. implementing two-level signal grouping where there are no splits within the color components by indicating no split and coding a refinement bit for each of the color components; and      iii. implementing two-level signal grouping where there is at least one split within the color components by indicating the split and coding each individual color component using a first level grouping; and    c. a processing component coupled to the memory, the processing component configured for processing the application.

26. The camera device of claim 25 wherein the first level grouping comprises:

a. sending an indicator bit for a group of pixels in a color component, indicating if all the bit values of the group members are the same;

b. if the bit values are the same, one bit is used to specify the bit value; and c. otherwise, refinement bits are sent for all group members.

27. The camera device of claim 26 wherein when the split happens in one color component, the split is also applied to the other two color components.

28. The camera device of claim 25 further comprising displaying an encoded image of the coded bits.

29. The camera device of claim 25 wherein the split comprises disparate bit values and the no split comprises same bit values.

30. The camera device of claim 25 wherein the color components are selected from the group consisting of RGB and YUV.

* * * * *